United States Patent [19]

Mueller, Jr. et al.

[11] Patent Number: 5,227,418
[45] Date of Patent: Jul. 13, 1993

[54] THERMALLY STABILIZED STEREOREGULAR, BRANCHED-MONO-1-OLEFIN POLYMER COMPOSITIONS

[75] Inventors: Francis X. Mueller, Jr.; Kiplin D. Cowan, both of Bartlesville, Okla.

[73] Assignee: Phillips Petroleum Company, Bartlesville, Okla.

[21] Appl. No.: 992,520

[22] Filed: Dec. 17, 1992

[51] Int. Cl.$^5$ .............................................. C08K 5/527
[52] U.S. Cl. .................... 524/120; 524/291; 524/381; 524/400; 252/400.24
[58] Field of Search ............... 524/120, 291, 381, 400; 252/400.24

[56] References Cited

U.S. PATENT DOCUMENTS

| | | | |
|---|---|---|---|
| 3,219,622 | 11/1965 | Luciani et al. | 524/381 |
| 4,366,280 | 12/1982 | Yukawa | 524/291 |
| 4,912,156 | 3/1990 | Yagi et al. | 524/120 |

FOREIGN PATENT DOCUMENTS 59-213747  12/1984  Japan.
61-91237   5/1986   Japan.

*Primary Examiner*—Veronica P. Hoke
*Attorney, Agent, or Firm*—Carl D. Corvin

[57] ABSTRACT

An additive composition comprising:
(a) tetrakis (methylene 3-(3,5-di-t-butyl-4-hydroxyphenyl) propionate) methane;
(b) bis (2,4-di-t-butylphenyl) pentaerythritol diphosphite; and
(c) calcium lactate is provided that improves the thermal-oxidative resistance of a stereoregular branched-mono-1-olefin polymer composition. Additionally, thermally-stabilized, stereoregular, branched mono-1-olefin polymer compositions are provided.

10 Claims, No Drawings

THERMALLY STABILIZED STEREOREGULAR, BRANCHED-MONO-1-OLEFIN POLYMER COMPOSITIONS

BACKGROUND

This invention is related to the field of stereoregular, branched-mono-1-olefin polymer compositions.

It is known in the art that polymer compositions need to be stabilized against a variety of degradation processes. These degradation processes can render a polymer composition almost entirely useless. For example, polymer compositions need to be stabilized against thermal-oxidative degradation because such degradation can tear apart the polymer chains as well as discolor the polymer composition. Stereoregular, branched-mono-1-olefin polymers (hereafter "SBM polymers") tend to be especially susceptible to oxidative-degradative processes due to, in part, the particular polymerization processes that are used to produce these polymers and/or the chemical structure of these polymers.

It is also known in the art that certain compounds can be added to a polymer composition to stabilize the polymer composition against certain degradation processes. However, it is also known that this area of polymer science is a highly unpredictable area.

SUMMARY

This invention provides an additive composition that has a combination of compounds that can improve a SBM polymer composition's resistance to thermal-oxidative degradation. Furthermore, this invention provides a SBM polymer composition that has a combination of compounds that improves a SBM polymer composition's resistance to thermal-oxidative degradation.

It is an object of this invention to provide an additive composition that improves the thermal-oxidative resistance of a SBM polymer.

It is another object of this invention to provide a SBM polymer composition that has an improved resistance to thermal-oxidative degradation.

It is another object of this invention to provide a polypropylene homopolymer or copolymer composition that has an improved resistance to thermal-oxidative degradation.

It is another object of this invention to provide a polymethylpentane homopolymer or copolymer composition that has an improved resistance to thermal-oxidative degradation.

In accordance with this invention an additive composition is provided that comprises (or optionally consists essentially of, or consists of):

(a) tetrakis (methylene 3-(3,5-di-t-butyl-4-hydroxyphenyl) propionate) methane;
(b) bis (2,4-di-t-butylphenyl) pentaerythritol diphosphite; and
(c) calcium lactate.

In accordance with another embodiment of this invention a polymer composition is provided that comprises (or optionally consists essentially of, or consists of):

(a) tetrakis (methylene 3-(3,5-di-t-butyl-4-hydroxyphenyl) propionate) methane;
(b) bis (2,4-di-t-butylphenyl) pentaerythritol diphosphite;
(c) calcium lactate; and
(d) a stereoregular, branched-mono-1-olefin polymer.

These and other objects, features, aspects, and advantages of this invention will become better understood with reference to the following description and claims.

DESCRIPTION

The SBM polymers that can be used in this invention are those polymers that have been formed by the polymerization of branched mono-1-olefins. These branched-mono-1-olefins have the following formula:

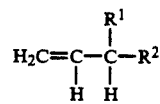

wherein $R^1$ is hydrogen or a $C_nH_{(2n+1)}$ alkyl, where n is an integer from 1 to about 4; and wherein $R^2$ is hydrogen or a $C_xH_{(2x+1)}$ alkyl, where x is an integer from 1 to about 6. Examples of branched-mono-1-olefins useful in this invention are: propylene; 3-methyl-1-butene; 3-methyl-1-pentene; 4-methyl-1-pentene; and 3-ethyl-1-hexene. These branched-mono-1-olefins can be polymerized by any method in the art, thereby producing the SBM polymers useful in this invention. Each of these branched-mono-1-olefins could be polymerized alone to form a SBM homopolymer, or it could be polymerized with any of the other branched-mono-1-olefins to form a SBM copolymer. Additionally, a branched-mono-1-olefin could be polymerized with monomers such as ethylene, 1-butene, 1-pentene, 1-hexene, or mixtures thereof, to form a SBM-monomer copolymer. However, it is believed that the major portion of this SBM-monomer copolymer should be a branched-mono-1-olefin in order to retain the benefits of this invention. The term "major portion" for the purposes of this specification means greater than 50 mole percent based on the total number of moles of branched-mono-1-olefin and monomer present in the SBM-monomer copolymer.

The additive composition of this invention comprises: (a) tetrakis (methylene 3-(3,5-di-t-butyl-4-hydroxyphenyl) propionate) methane; (b) bis (2,4-di-t-butylphenyl) pentaerythritol diphosphite; and (c) calcium lactate. The components of this composition can be further described as follows.

Tetrakis (methylene 3-(3,5-di-t-butyl-4-hydroxyphenyl) propionate) methane also known as tetrakis (methylene (3,5-di-t-butyl-4-hydroxyhydrocinnamate)) methane is commercially available from the Ciba-Geigy Corporation as Irganox 1010. Bis (2,4-di-t-butylphenyl) pentaerythritol diphosphite is commerically available from the General Electric Corporation as Ultranox 626. Calcium lactate is available from the C. J. Patterson Company as Pationic 1230 or 1240.

The amount of each additive to use in the additive composition is generally in the range of about 1 weight percent to about 98 weight percent based on the total weight of the additive composition. However, it is preferred that the amounts used be "substantially equal" for best results. The term "substantially equal" means for the purposes of this specification that the weight ratio of any one component to another component is within the range of about 0.5 to about 2. For example, an additive composition could have 5 parts by weight Irganox 1010, 10 parts by weight Ultranox 626, and 10 parts by weight Pationic 1230.

The amount of each additive to use in the SBM polymer composition is generally in the range of about 0.001 weight percent to about 5 weight percent based on the weight of the SBM polymer. However, it is preferred that the amount of each additive is in the range of about 0.005 to about 3 weight percent; and most preferably the amount of each additive is in the range of 0.01 to 1 weight percent. Generally, the total amount of additives to add to the SBM polymer is not greater than about 5 weight percent based on the weight of the SBM polymer. However, amounts as low as about 0.01 weight percent may be used. If too little of these additives are added to the SBM polymer to form the SBM polymer composition, the SBM polymer composition might not obtain the full benefits of this invention. Furthermore, adding too much of the additives can be expensive and can significantly and adversely affect the other properties of the SBM polymer composition.

Other additives optionally can be incorporated into the SBM polymer composition. Examples are antifogging agents, antimicrobial agents, antioxidants, colorants, coupling agents, flame retardants, foaming agents, fragrances, lubricants, mold release agents, organic peroxides, plasticizers, smoke suppressants, heat stabilizers, ultra-violet light stabilizers, fibrous reinforcements, fillers, nickel stabilizers, antistatic agents, and mixtures of two or more of these additives. Further information on these additives can be found on pages 143-220 of the Modern Plastics Encyclopedia '92.

The additive composition can be produced by blending together the individual compounds. In the alternative, each of the above additive compounds can be blended with the SBM polymer to form the SBM polymer composition. These compounds can be blended together in any manner known in the art. For example, the components of the SBM polymer composition can be combined by dry mixing in the form of a powder or wet mixing in the form of a solution or slurry. In these types of methods, the SBM polymer can be in any form such as fluff, powder, granulate, pellet, solution, slurry, or emulsion.

EXAMPLE

This example is provided to further assist a person skilled in the art with understanding this invention. The particular compounds and parameters are intended to be merely illustrative of this invention and are not meant to be construed as unduly limiting the reasonable scope of this invention.

The following compounds were used in this invention.

(1) Irganox 1010 (hereafter I1010) also known as "tetrakis (methylene 3-(3,5-di-t-butyl-4-hydroxyphenyl) propionate) methane" and also known as "tetrakis (methylene (3,5-di-t-butyl-4-hydroxyhydrocinnamate)) methane" (see structure one). This compound is available from the Ciba-Geigy Corporation.

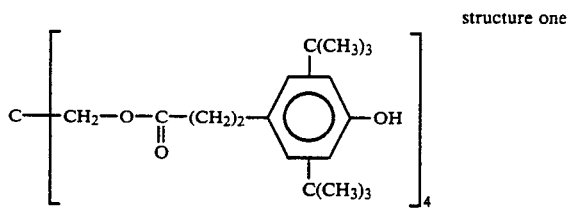

structure one (2) Ethanox 330 (hereafter ET330) also known as "1,3,5-trimethyl-2,4,6-tris (3,5-di-t-butyl-4-hydroxybenzyl) benzene" (see structure two). This compound is available from the Ethyl Corporation.

structure two (3) Ultranox 626 (hereafter UL626) also known as "bis (2,4-di-t-butylphenyl) pentaerythritol diphosphite" (see structure three). This compound is available from the General Electric Corporation.

structure three (4) Pationic 1230 and Pationic 1240 (hereafter P1230 and P1240, respectively) also known as "Calcium Lactate" (see Structure Four). Pationic 1230 is a calcium lactate composition with a ph of about 7. Pationic 1240 is a calcium lactate composition with a ph of about 10. These compounds are available from the C. J. Patterson Company.

structure four

In the following Table, the composition of each sample in each run was prepared by mixing the stated quantities of each compound with an unstabilized polypropylene fluff. In particular, each sample was prepared by dry blending 400 grams of the unstabilized polypropylene fluff with the indicated compounds. This composition was then extruded at a temperature of about 230° C. and then the extruded composition was pelletized. The pellets were then compression molded into 0.51 inch thick plaques at a temperature of about 219° C. Five strips having the dimensions of 4.44 centimeters by 6.35 millimeters were cut from the plaque and the strips were placed into separated tubes for hanging in a forced air oven. The thermal-oxidative stability of each sample was then determined by oven aging each sample at a temperature of about 150° C. This oven aging was conducted using a procedure similar to the procedure in ASTM-D-3012-84, except that a biaxial rotator was not used to change the position of the samples during the aging process. The samples were manually rotated approximately every 24 hours to minimize the effect of any possible oven hotspots. Each sample was checked daily for embrittlement by bending the strips 90 degrees. The results are reported in days to failure, and more stable samples have longer times to embrittlement.

TABLE I

| Run | WEIGHT PERCENTS | | | | | THERMAL STABILITY DAYS TO FAILURE |
|---|---|---|---|---|---|---|
| | I1010 | ET330 | UL626 | P1230 | P1240 | |
| 1 | 0.07 | 0 | 0.1 | 0 | 0 | 5 |
| 2 | 0 | 0.07 | 0.1 | 0 | 0 | 6 |
| 3 | 0.07 | 0 | 0.1 | 0.1 | 0 | 37 |
| 4 | 0 | 0.07 | 0.1 | 0.1 | 0 | 18 |
| 5 | 0.07 | 0 | 0.1 | 0 | 0.1 | 35 |
| 6 | 0 | 0.07 | 0.1 | 0 | 0.1 | 18 |

It is apparent from the above results that Runs 3 and 5 indicate that an additive package that comprises I1010, UL626, and Calcium Lactate had a six hundred percent increase in thermal-oxidative stability over Runs 1 and 2. Furthermore, this additive package has a two hundred percent increase in thermal-oxidative stability over Runs 4 and 6.

Although this invention has been described in considerable detail with reference to certain preferred embodiments thereof, other versions are possible. Therefore, the spirit and scope of the claims should not be limited to the description of the preferred embodiments contained herein.

That which is claimed is:

1. An additive composition comprising:
    (a) tetrakis (methylene 3-(3,5-di-t-butyl-4-hydroxyphenyl) propionate) methane;
    (b) bis (2,4-di-t-butylphenyl) pentaerythritol diphosphite; and
    (c) calcium lactate.

2. An additive composition according to claim 1 wherein the amount by weight of each component is substantially equal.

3. A stereoregular, branched-mono-1-olefin polymer composition comprising:
    (a) tetrakis (methylene 3-(3,5-di-t-butyl-4-hydroxyphenyl) propionate) methane;
    (b) bis (2,4-di-t-butylphenyl) pentaerythritol diphosphite; and
    (c) calcium lactate; and
    (d) a stereoregular, branched-mono-1-olefin polymer.

4. A composition according to claim 3 wherein the amount of components (a), (b), and (c) is from about 0.005 weight percent to about 3 weight percent based on the weight of the weight of component (d).

5. A composition according to claim 3 wherein said branched-mono-1-olefin has the formula:

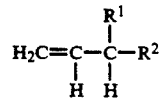

wherein $R^1$ is hydrogen or a $C_nH_{(2n+1)}$ alkyl, where n is an integer from 1 to about 4; and wherein $R^2$ is a hydrogen or a $C_xH_{(2x+1)}$ alkyl, where x is an integer from 1 to about 6.

6. A composition according to claim 3 wherein said branched mono-1-olefin is propylene, 3-methyl-1-butene, 3-methyl-1-pentene, 4-methyl-1-pentene, 3-ethyl-1-hexene, and mixtures of two or more said branched-mono-1-olefins.

7. A composition according to claim 3 wherein said branched mono-1-olefin is propylene.

8. A composition according to claim 3 wherein said branched-mono-1-olefin is 4-methyl-1-pentene.

9. A composition according to claim 3 wherein said stereoregular, branched-mono-1-olefin polymer is a copolymer.

10. A composition according to claim 9 wherein said copolymer comprises a major amount of propylene and a minor amount of another mono-1-olefin.

* * * * *